United States Patent
Master et al.

(10) Patent No.: US 7,493,375 B2
(45) Date of Patent: *Feb. 17, 2009

(54) STORAGE AND DELIVERY OF DEVICE FEATURES

(75) Inventors: Paul L. Master, Sunnyvale, CA (US); John Watson, Edgewood, WA (US)

(73) Assignee: QST Holding, LLC, Palo Alto, CA (US)

( * ) Notice: Subject to any disclaimer, the term of this patent is extended or adjusted under 35 U.S.C. 154(b) by 364 days.

This patent is subject to a terminal disclaimer.

(21) Appl. No.: 10/135,905

(22) Filed: Apr. 29, 2002

(65) Prior Publication Data

US 2003/0204575 A1    Oct. 30, 2003

(51) Int. Cl.
*G06F 15/177* (2006.01)
(52) U.S. Cl. .......................... 709/220; 707/2
(58) Field of Classification Search ................. 709/217, 709/218, 219, 220–227, 238, 201–203, 236, 709/245, 230; 455/42–45, 419, 503; 375/148, 375/285; 712/15, 43, 220; 370/466, 490; 711/141
See application file for complete search history.

(56) References Cited

U.S. PATENT DOCUMENTS

| | | | |
|---|---|---|---|
| 3,409,175 A | 11/1968 | Byme | |
| 3,666,143 A | 5/1972 | Weston | |
| 3,938,639 A | 2/1976 | Birrell | |
| 3,949,903 A | 4/1976 | Benasutti et al. | |
| 3,960,298 A | 6/1976 | Birrell | |
| 3,967,062 A | 6/1976 | Dobias | |
| 3,991,911 A | 11/1976 | Shannon et al. | |

(Continued)

FOREIGN PATENT DOCUMENTS

EP    0 301 169 A1    2/1989

(Continued)

OTHER PUBLICATIONS

A 1 V heterogeneous reconfigurable processor IC for baseband wireless applications Zhang, H.; Prabhu, V.; George, V.; Wan, M.; Benes, M.; Abnous, A.; Rabaey, J.M.; Solid-State Circuits Conference, 2000. Digest of Technical Papers. ISSCC. 2000 IEEE International Feb. 7-9, 2000 pp. 68-69, 448.*

(Continued)

*Primary Examiner*—Thong H Vu
(74) *Attorney, Agent, or Firm*—Mark S. Kaufman; Wayne Tang; Nixon Peabody LLP (57) ABSTRACT

A system for permitting new, or enhanced, functionality to be transferred to an adaptable device. In a preferred embodiment, the permitted functionality is determined according to an accounting method associated with a user's account. This approach allows a user to contract for specific services, functionality, etc. regardless of changes over time such as changes to data formats, communication protocols, external devices or infrastructure, etc. In a preferred embodiment, the functionality is stored on a ubiquitous communications network such as the Internet. Functionality is transferred to different devices as digital information over the network. This allows hardware functionality to be licensed in many forms. For example, site licenses can be obtained for companies; hardware "trialware" can be provided to allow limited functionality for a limited time for lower-cost payments, etc.

37 Claims, 3 Drawing Sheets

U.S. PATENT DOCUMENTS

| | | |
|---|---|---|
| 3,995,441 A | 12/1976 | McMillin |
| 4,076,145 A | 2/1978 | Zygiel |
| 4,143,793 A | 3/1979 | McMillin et al. |
| 4,172,669 A | 10/1979 | Edelbach |
| 4,174,872 A | 11/1979 | Fessler |
| 4,181,242 A | 1/1980 | Zygiel |
| RE30,301 E | 6/1980 | Zygiel |
| 4,218,014 A | 8/1980 | Tracy |
| 4,222,972 A | 9/1980 | Caldwell |
| 4,237,536 A | 12/1980 | Enelow et al. |
| 4,252,253 A | 2/1981 | Shannon |
| 4,302,775 A | 11/1981 | Widergren et al. |
| 4,333,587 A | 6/1982 | Fessler et al. |
| 4,354,613 A | 10/1982 | Desai et al. |
| 4,377,246 A | 3/1983 | McMillin et al. |
| 4,380,046 A | 4/1983 | Fung |
| 4,393,468 A | 7/1983 | New |
| 4,413,752 A | 11/1983 | McMillin et al. |
| 4,458,584 A | 7/1984 | Annese et al. |
| 4,466,342 A | 8/1984 | Basile et al. |
| 4,475,448 A | 10/1984 | Shoaf et al. |
| 4,509,690 A | 4/1985 | Austin et al. |
| 4,520,950 A | 6/1985 | Jeans |
| 4,549,675 A | 10/1985 | Austin |
| 4,553,573 A | 11/1985 | McGarrah |
| 4,560,089 A | 12/1985 | McMillin et al. |
| 4,577,782 A | 3/1986 | Fessler |
| 4,578,799 A | 3/1986 | Scholl et al. |
| RE32,179 E | 6/1986 | Sedam et al. |
| 4,633,386 A | 12/1986 | Terepin et al. |
| 4,658,988 A | 4/1987 | Hassell |
| 4,694,416 A | 9/1987 | Wheeler et al. |
| 4,711,374 A | 12/1987 | Gaunt et al. |
| 4,713,755 A | 12/1987 | Worley, Jr. et al. |
| 4,719,056 A | 1/1988 | Scott |
| 4,726,494 A | 2/1988 | Scott |
| 4,747,516 A | 5/1988 | Baker |
| 4,748,585 A | 5/1988 | Chiarulli et al. |
| 4,758,985 A | 7/1988 | Carter |
| 4,760,525 A | 7/1988 | Webb |
| 4,760,544 A | 7/1988 | Lamb |
| 4,765,513 A | 8/1988 | McMillin et al. |
| 4,766,548 A | 8/1988 | Cedrone et al. |
| 4,781,309 A | 11/1988 | Vogel |
| 4,800,492 A | 1/1989 | Johnson et al. |
| 4,811,214 A | 3/1989 | Nosenchuck et al. |
| 4,824,075 A | 4/1989 | Holzboog |
| 4,827,426 A | 5/1989 | Patton et al. |
| 4,850,269 A | 7/1989 | Hancock et al. |
| 4,856,684 A | 8/1989 | Gerstung |
| 4,870,302 A | 9/1989 | Freeman |
| 4,901,887 A | 2/1990 | Burton |
| 4,905,231 A | 2/1990 | Leung et al. |
| 4,921,315 A | 5/1990 | Metcalfe et al. |
| 4,930,666 A | 6/1990 | Rudick |
| 4,932,564 A | 6/1990 | Austin et al. |
| 4,936,488 A | 6/1990 | Austin |
| 4,937,019 A | 6/1990 | Scott |
| 4,960,261 A | 10/1990 | Scott et al. |
| 4,961,533 A | 10/1990 | Teller et al. |
| 4,967,340 A | 10/1990 | Dawes |
| 4,974,643 A | 12/1990 | Bennett et al. |
| 4,982,876 A | 1/1991 | Scott |
| 4,993,604 A | 2/1991 | Gaunt et al. |
| 5,007,560 A | 4/1991 | Sassak |
| 5,021,947 A | 6/1991 | Campbell et al. |
| 5,040,106 A | 8/1991 | Maag |
| 5,044,171 A | 9/1991 | Farkas |
| 5,090,015 A | 2/1992 | Dabbish et al. |
| 5,099,418 A | 3/1992 | Pian et al. |
| 5,129,549 A | 7/1992 | Austin |
| 5,139,708 A | 8/1992 | Scott |
| 5,144,166 A | 9/1992 | Camarota et al. |
| 5,156,301 A | 10/1992 | Hassell et al. |
| 5,156,871 A | 10/1992 | Goulet et al. |
| 5,165,023 A | 11/1992 | Gifford |
| 5,165,575 A | 11/1992 | Scott |
| 5,190,083 A | 3/1993 | Gupta et al. |
| 5,190,189 A | 3/1993 | Zimmer et al. |
| 5,193,151 A * | 3/1993 | Jain ........................... 709/237 |
| 5,193,718 A | 3/1993 | Hassell et al. |
| 5,202,993 A | 4/1993 | Tarsy et al. |
| 5,203,474 A | 4/1993 | Haynes |
| 5,218,240 A | 6/1993 | Camarota et al. |
| 5,240,144 A | 8/1993 | Feldman |
| 5,245,227 A | 9/1993 | Furtek et al. |
| 5,261,099 A | 11/1993 | Bigo et al. |
| 5,263,509 A | 11/1993 | Cherry et al. |
| 5,269,442 A | 12/1993 | Vogel |
| 5,280,711 A | 1/1994 | Motta et al. |
| 5,297,400 A | 3/1994 | Benton et al. |
| 5,301,100 A | 4/1994 | Wagner |
| 5,303,846 A | 4/1994 | Shannon |
| 5,335,276 A | 8/1994 | Thompson et al. |
| 5,336,950 A | 8/1994 | Popli et al. |
| 5,339,428 A | 8/1994 | Burmeister et al. |
| 5,343,716 A | 9/1994 | Swanson et al. |
| 5,347,446 A * | 9/1994 | Iino et al. ..................... 700/29 |
| 5,361,362 A | 11/1994 | Benkeser et al. |
| 5,368,198 A | 11/1994 | Goulet |
| 5,379,343 A | 1/1995 | Grube et al. |
| 5,381,546 A | 1/1995 | Servi et al. |
| 5,381,550 A | 1/1995 | Jourdenais et al. |
| 5,388,062 A | 2/1995 | Knutson |
| 5,388,212 A | 2/1995 | Grube et al. |
| 5,392,960 A | 2/1995 | Kendt et al. |
| 5,437,395 A | 8/1995 | Bull et al. |
| 5,450,557 A | 9/1995 | Kopp et al. |
| 5,454,406 A | 10/1995 | Rejret et al. |
| 5,465,368 A | 11/1995 | Davidson et al. |
| 5,475,856 A | 12/1995 | Kogge |
| 5,479,055 A | 12/1995 | Eccles |
| 5,490,165 A | 2/1996 | Blakeney, II et al. |
| 5,491,823 A | 2/1996 | Ruttenberg |
| 5,507,009 A | 4/1996 | Grube et al. |
| 5,515,519 A | 5/1996 | Yoshioka et al. |
| 5,517,600 A | 5/1996 | Shimokawa |
| 5,519,694 A | 5/1996 | Brewer et al. |
| 5,522,070 A | 5/1996 | Sumimoto |
| 5,530,964 A | 6/1996 | Alpert et al. |
| 5,534,796 A | 7/1996 | Edwards |
| 5,542,265 A | 8/1996 | Rutland |
| 5,553,755 A | 9/1996 | Bonewald et al. |
| 5,555,417 A | 9/1996 | Odnert et al. |
| 5,560,028 A | 9/1996 | Sachs et al. |
| 5,560,038 A * | 9/1996 | Haddock ................... 709/236 |
| 5,570,587 A | 11/1996 | Kim |
| 5,572,572 A | 11/1996 | Kawan et al. |
| 5,590,353 A | 12/1996 | Sakakibara et al. |
| 5,594,657 A | 1/1997 | Cantone et al. |
| 5,600,810 A | 2/1997 | Ohkami |
| 5,600,844 A * | 2/1997 | Shaw et al. ................. 715/500 |
| 5,602,833 A | 2/1997 | Zehavi |
| 5,603,043 A | 2/1997 | Taylor et al. |
| 5,607,083 A | 3/1997 | Vogel et al. |
| 5,608,643 A | 3/1997 | Wichter et al. |
| 5,611,867 A | 3/1997 | Cooper et al. |
| 5,623,545 A | 4/1997 | Childs et al. |
| 5,625,669 A | 4/1997 | McGregor et al. |
| 5,626,407 A | 5/1997 | Westcott |
| 5,630,206 A | 5/1997 | Urban et al. |
| 5,635,940 A | 6/1997 | Hickman et al. |
| 5,646,544 A | 7/1997 | Iadanza |
| 5,646,545 A | 7/1997 | Trimberger et al. |

| Patent | Type | Date | Inventor |
|---|---|---|---|
| 5,647,512 | A | 7/1997 | Assis Mascarenhas de Oliveira et al. |
| 5,667,110 | A | 9/1997 | McCann et al. |
| 5,684,793 | A | 11/1997 | Kiema et al. |
| 5,684,980 | A | 11/1997 | Casselman |
| 5,687,236 | A | 11/1997 | Moskowitz et al. |
| 5,694,613 | A | 12/1997 | Suzuki |
| 5,694,794 | A | 12/1997 | Jerg et al. |
| 5,699,328 | A | 12/1997 | Ishizaki et al. |
| 5,701,398 | A | 12/1997 | Glier et al. |
| 5,701,482 | A | 12/1997 | Harrison et al. |
| 5,704,053 | A | 12/1997 | Santhanam |
| 5,706,191 | A | 1/1998 | Bassett et al. |
| 5,706,976 | A | 1/1998 | Purkey |
| 5,712,996 | A | 1/1998 | Schepers |
| 5,720,002 | A | 2/1998 | Wang |
| 5,721,693 | A | 2/1998 | Song |
| 5,721,854 | A | 2/1998 | Ebicioglu et al. |
| 5,729,754 | A | 3/1998 | Estes |
| 5,732,563 | A | 3/1998 | Bethuy et al. |
| 5,734,808 | A | 3/1998 | Takeda |
| 5,737,631 | A | 4/1998 | Trimberger |
| 5,742,180 | A | 4/1998 | DeHon et al. |
| 5,742,821 | A | 4/1998 | Prasanna |
| 5,745,366 | A | 4/1998 | Highma et al. |
| RE35,780 | E | 5/1998 | Hassell et al. |
| 5,751,295 | A | 5/1998 | Becklund et al. |
| 5,754,227 | A | 5/1998 | Fukuoka |
| 5,758,261 | A | 5/1998 | Weideman |
| 5,768,561 | A | 6/1998 | Wise |
| 5,778,439 | A | 7/1998 | Trimberger et al. |
| 5,784,636 | A | 7/1998 | Rupp |
| 5,787,237 | A | 7/1998 | Reilly |
| 5,790,817 | A | 8/1998 | Asghar et al. |
| 5,791,517 | A | 8/1998 | Avital |
| 5,791,523 | A | 8/1998 | Oh |
| 5,794,062 | A | 8/1998 | Baxter |
| 5,794,067 | A | 8/1998 | Kadowaki |
| 5,802,055 | A | 9/1998 | Krein et al. |
| 5,818,603 | A | 10/1998 | Motoyama |
| 5,822,308 | A | 10/1998 | Weigand et al. |
| 5,822,313 | A | 10/1998 | Malek et al. |
| 5,822,360 | A | 10/1998 | Lee et al. |
| 5,828,858 | A | 10/1998 | Athanas et al. |
| 5,829,085 | A | 11/1998 | Jerg et al. |
| 5,835,753 | A | 11/1998 | Witt |
| 5,838,165 | A | 11/1998 | Chatter |
| 5,845,815 | A | 12/1998 | Vogel |
| 5,860,021 | A | 1/1999 | Klingman |
| 5,862,961 | A | 1/1999 | Motta et al. |
| 5,870,427 | A | 2/1999 | Teidemann, Jr. et al. |
| 5,873,045 | A | 2/1999 | Lee et al. |
| 5,881,106 | A | 3/1999 | Cartier |
| 5,884,284 | A | 3/1999 | Peters et al. |
| 5,886,537 | A | 3/1999 | Macias et al. |
| 5,887,174 | A | 3/1999 | Simons et al. |
| 5,889,816 | A | 3/1999 | Agrawal et al. |
| 5,890,014 | A | 3/1999 | Long |
| 5,892,900 | A | 4/1999 | Ginter et al. |
| 5,892,961 | A | 4/1999 | Trimberger |
| 5,892,962 | A | 4/1999 | Cloutier |
| 5,894,473 | A | 4/1999 | Dent |
| 5,901,884 | A | 5/1999 | Goulet et al. |
| 5,903,886 | A | 5/1999 | Heimlich et al. |
| 5,907,285 | A | 5/1999 | Toms et al. |
| 5,907,580 | A | 5/1999 | Cummings |
| 5,910,733 | A | 6/1999 | Bertolet et al. |
| 5,912,572 | A | 6/1999 | Graf, III |
| 5,913,172 | A * | 6/1999 | McCabe et al. ............. 455/503 |
| 5,917,852 | A | 6/1999 | Butterfield et al. |
| 5,920,801 | A | 7/1999 | Thomas et al. |
| 5,931,918 | A | 8/1999 | Row et al. |
| 5,933,642 | A | 8/1999 | Greenbaum et al. |
| 5,940,438 | A | 8/1999 | Poon et al. |
| 5,943,481 | A * | 8/1999 | Wakeland ................... 709/230 |
| 5,946,386 | A * | 8/1999 | Rogers et al. .......... 379/265.09 |
| 5,949,415 | A | 9/1999 | Lin et al. |
| 5,950,011 | A * | 9/1999 | Albrecht et al. .............. 717/167 |
| 5,950,131 | A | 9/1999 | Vilmur |
| 5,951,674 | A | 9/1999 | Moreno |
| 5,953,322 | A | 9/1999 | Kimball |
| 5,956,518 | A | 9/1999 | DeHon et al. |
| 5,956,967 | A | 9/1999 | Kim |
| 5,959,811 | A | 9/1999 | Richardson |
| 5,959,881 | A | 9/1999 | Trimberger et al. |
| 5,963,048 | A | 10/1999 | Harrison et al. |
| 5,966,534 | A | 10/1999 | Cooke et al. |
| 5,970,254 | A | 10/1999 | Cooke et al. |
| 5,987,105 | A | 11/1999 | Jenkins et al. |
| 5,987,611 | A | 11/1999 | Freund |
| 5,991,302 | A | 11/1999 | Berl et al. |
| 5,991,308 | A | 11/1999 | Fuhrmann et al. |
| 5,993,739 | A | 11/1999 | Lyon |
| 5,999,734 | A | 12/1999 | Willis et al. |
| 6,005,943 | A | 12/1999 | Cohen et al. |
| 6,006,249 | A | 12/1999 | Leong |
| 6,016,395 | A | 1/2000 | Mohamed |
| 6,021,186 | A | 2/2000 | Suzuki et al. |
| 6,021,492 | A * | 2/2000 | May .......................... 713/200 |
| 6,023,742 | A | 2/2000 | Ebeling et al. |
| 6,023,755 | A | 2/2000 | Casselman |
| 6,028,610 | A | 2/2000 | Deering |
| 6,036,166 | A | 3/2000 | Olson |
| 6,039,219 | A | 3/2000 | Bach et al. |
| 6,041,322 | A | 3/2000 | Meng et al. |
| 6,041,970 | A | 3/2000 | Vogel |
| 6,046,603 | A | 4/2000 | New |
| 6,047,115 | A | 4/2000 | Mohan et al. |
| 6,052,600 | A | 4/2000 | Fette et al. |
| 6,055,314 | A | 4/2000 | Spies et al. |
| 6,056,194 | A | 5/2000 | Kolls |
| 6,059,840 | A | 5/2000 | Click, Jr. |
| 6,061,580 | A | 5/2000 | Altschul et al. |
| 6,073,132 | A | 6/2000 | Gehman |
| 6,076,174 | A | 6/2000 | Freund |
| 6,078,736 | A | 6/2000 | Guccione |
| 6,085,740 | A | 7/2000 | Ivri et al. |
| 6,088,043 | A | 7/2000 | Kelleher et al. |
| 6,091,263 | A | 7/2000 | New et al. |
| 6,091,765 | A | 7/2000 | Pietzold, III et al. |
| 6,094,065 | A | 7/2000 | Tavana et al. |
| 6,094,726 | A | 7/2000 | Gonion et al. |
| 6,111,893 | A * | 8/2000 | Volftsun et al. ............. 370/466 |
| 6,111,935 | A * | 8/2000 | Hughes-Hartogs ....... 379/27.01 |
| 6,115,751 | A | 9/2000 | Tam et al. |
| 6,119,178 | A | 9/2000 | Martin et al. |
| 6,120,551 | A | 9/2000 | Law et al. |
| 6,122,670 | A | 9/2000 | Bennett et al. |
| 6,128,307 | A | 10/2000 | Brown |
| 6,134,605 | A | 10/2000 | Hudson et al. |
| 6,138,693 | A | 10/2000 | Matz |
| 6,141,283 | A | 10/2000 | Bogin et al. |
| 6,150,838 | A | 11/2000 | Wittig et al. |
| 6,154,494 | A | 11/2000 | Sugahara et al. |
| 6,157,997 | A | 12/2000 | Oowaki et al. |
| 6,173,389 | B1 | 1/2001 | Pechanek et al. |
| 6,175,854 | B1 | 1/2001 | Bretscher |
| 6,175,892 | B1 | 1/2001 | Sazzad et al. |
| 6,181,981 | B1 | 1/2001 | Varga et al. |
| 6,185,418 | B1 | 2/2001 | MacLellan et al. |
| 6,192,070 | B1 | 2/2001 | Poon et al. |
| 6,192,255 | B1 | 2/2001 | Lewis et al. |
| 6,192,388 | B1 | 2/2001 | Cajolet |
| 6,195,788 | B1 | 2/2001 | Leaver et al. |
| 6,198,924 | B1 | 3/2001 | Ishii et al. |
| 6,199,181 | B1 | 3/2001 | Rechef et al. |

| | | |
|---|---|---|
| 6,202,130 B1 | 3/2001 | Scales, III et al. |
| 6,202,189 B1 | 3/2001 | Hinedi et al. |
| 6,205,537 B1 * | 3/2001 | Albonesi .................... 712/43 |
| 6,219,697 B1 * | 4/2001 | Lawande et al. ............ 709/221 |
| 6,219,756 B1 | 4/2001 | Kasamizugami |
| 6,219,780 B1 | 4/2001 | Lipasti |
| 6,223,222 B1 * | 4/2001 | Fijolek et al. ............... 709/227 |
| 6,226,387 B1 | 5/2001 | Tewfik et al. |
| 6,230,307 B1 | 5/2001 | Davis et al. |
| 6,233,610 B1 * | 5/2001 | Hayball et al. ............. 709/223 |
| 6,237,029 B1 * | 5/2001 | Master et al. ............... 709/217 |
| 6,246,883 B1 | 6/2001 | Lee |
| 6,247,125 B1 | 6/2001 | Noel-Baron et al. |
| 6,249,251 B1 | 6/2001 | Chang et al. |
| 6,258,725 B1 | 7/2001 | Lee et al. |
| 6,263,057 B1 | 7/2001 | Silverman |
| 6,266,760 B1 | 7/2001 | DeHon et al. |
| 6,272,579 B1 | 8/2001 | Lentz et al. |
| 6,272,616 B1 | 8/2001 | Fernando et al. |
| 6,281,703 B1 | 8/2001 | Furuta et al. |
| 6,282,627 B1 | 8/2001 | Wong et al. |
| 6,289,375 B1 | 9/2001 | Knight et al. |
| 6,289,388 B1 * | 9/2001 | Disney et al. ............... 709/238 |
| 6,289,434 B1 | 9/2001 | Roy |
| 6,289,488 B1 | 9/2001 | Dave et al. |
| 6,292,822 B1 | 9/2001 | Hardwick |
| 6,292,827 B1 | 9/2001 | Raz |
| 6,292,830 B1 * | 9/2001 | Taylor et al. ................ 709/224 |
| 6,301,653 B1 | 10/2001 | Mohamed et al. |
| 6,305,014 B1 | 10/2001 | Roediger et al. |
| 6,311,149 B1 | 10/2001 | Ryan et al. |
| 6,321,985 B1 | 11/2001 | Kolls |
| 6,326,806 B1 | 12/2001 | Fallside et al. |
| 6,346,824 B1 | 2/2002 | New |
| 6,347,346 B1 | 2/2002 | Taylor |
| 6,349,394 B1 | 2/2002 | Brock et al. |
| 6,353,841 B1 | 3/2002 | Marshall et al. |
| 6,356,994 B1 | 3/2002 | Barry et al. |
| 6,359,248 B1 | 3/2002 | Mardi |
| 6,360,256 B1 * | 3/2002 | Lim .......................... 709/223 |
| 6,360,259 B1 | 3/2002 | Bradley |
| 6,360,263 B1 | 3/2002 | Kurtzberg et al. |
| 6,363,411 B1 | 3/2002 | Dugan et al. |
| 6,366,999 B1 | 4/2002 | Drabenstott et al. |
| 6,377,983 B1 | 4/2002 | Cohen et al. |
| 6,378,072 B1 | 4/2002 | Collins et al. |
| 6,381,293 B1 | 4/2002 | Lee et al. |
| 6,381,735 B1 | 4/2002 | Hunt |
| 6,385,751 B1 | 5/2002 | Wolf |
| 6,405,214 B1 | 6/2002 | Meade, II |
| 6,408,039 B1 | 6/2002 | Ito |
| 6,410,941 B1 | 6/2002 | Taylor et al. |
| 6,411,612 B1 | 6/2002 | Halford et al. |
| 6,421,372 B1 | 7/2002 | Bierly et al. |
| 6,421,809 B1 | 7/2002 | Wuytack et al. |
| 6,426,649 B1 | 7/2002 | Fu et al. |
| 6,430,624 B1 | 8/2002 | Jamtgaard et al. |
| 6,433,578 B1 | 8/2002 | Wasson |
| 6,434,590 B1 | 8/2002 | Blelloch et al. |
| 6,438,737 B1 | 8/2002 | Morelli et al. |
| 6,456,996 B1 | 9/2002 | Crawford, Jr. et al. |
| 6,459,883 B2 | 10/2002 | Subramanian et al. |
| 6,467,009 B1 | 10/2002 | Winegarden et al. |
| 6,469,540 B2 | 10/2002 | Nakaya |
| 6,473,609 B1 | 10/2002 | Schwartz et al. |
| 6,483,343 B1 | 11/2002 | Faith et al. |
| 6,507,947 B1 | 1/2003 | Schreiber et al. |
| 6,510,138 B1 | 1/2003 | Pannell |
| 6,510,510 B1 | 1/2003 | Garde |
| 6,538,470 B1 | 3/2003 | Langhammer et al. |
| 6,546,381 B1 * | 4/2003 | Subramanian et al. ......... 707/2 |
| 6,549,988 B1 * | 4/2003 | Gertner ...................... 711/141 |
| 6,556,044 B2 | 4/2003 | Langhammer et al. |
| 6,563,891 B1 | 5/2003 | Eriksson et al. |
| 6,570,877 B1 | 5/2003 | Kloth et al. |
| 6,577,678 B2 | 6/2003 | Scheuermann |
| 6,587,684 B1 * | 7/2003 | Hsu et al. .................... 455/419 |
| 6,590,415 B2 | 7/2003 | Agrawal et al. |
| 6,591,299 B2 * | 7/2003 | Riddle et al. ................. 709/224 |
| 6,601,086 B1 | 7/2003 | Howard et al. |
| 6,601,158 B1 | 7/2003 | Abbott et al. |
| 6,604,085 B1 | 8/2003 | Kolls |
| 6,604,189 B1 | 8/2003 | Zemlyak et al. |
| 6,606,529 B1 | 8/2003 | Crowder, Jr. et al. |
| 6,615,333 B1 | 9/2003 | Hoogerbrugge et al. |
| 6,618,434 B2 * | 9/2003 | Heidari-Bateni et al. .... 375/148 |
| 6,633,923 B1 * | 10/2003 | Kukura et al. ............... 719/316 |
| 6,640,304 B2 | 10/2003 | Ginter et al. |
| 6,647,429 B1 | 11/2003 | Semal |
| 6,653,859 B2 | 11/2003 | Sihlbom et al. |
| 6,667,992 B1 * | 12/2003 | Yanagawa .................... 370/490 |
| 6,675,265 B2 | 1/2004 | Barroso et al. |
| 6,675,284 B1 | 1/2004 | Warren |
| 6,681,258 B1 * | 1/2004 | Ratcliff et al. ............... 709/245 |
| 6,691,148 B1 * | 2/2004 | Zinky et al. .................. 709/201 |
| 6,694,380 B1 | 2/2004 | Wolrich et al. |
| 6,711,617 B1 * | 3/2004 | Bantz et al. .................. 709/227 |
| 6,718,182 B1 | 4/2004 | Kung |
| 6,721,286 B1 | 4/2004 | Williams et al. |
| 6,721,884 B1 | 4/2004 | De Oliveira Kastrup Pereira et al. |
| 6,732,354 B2 * | 5/2004 | Ebeling et al. ............... 717/119 |
| 6,735,621 B1 * | 5/2004 | Yoakum et al. ............. 709/218 |
| 6,738,744 B2 | 5/2004 | Kirovski et al. |
| 6,748,360 B2 | 6/2004 | Pitman et al. |
| 6,751,723 B1 | 6/2004 | Kundu et al. |
| 6,754,470 B2 | 6/2004 | Hendrickson et al. |
| 6,760,587 B2 | 7/2004 | Holtzman et al. |
| 6,760,833 B1 | 7/2004 | Dowling |
| 6,766,165 B2 | 7/2004 | Sharma et al. |
| 6,769,032 B1 * | 7/2004 | Katiyar et al. ............... 709/246 |
| 6,778,212 B1 | 8/2004 | Deng et al. |
| 6,785,341 B2 | 8/2004 | Walton et al. |
| 6,795,851 B1 * | 9/2004 | Noy .......................... 709/218 |
| 6,819,140 B2 | 11/2004 | Yamanaka et al. |
| 6,823,448 B2 | 11/2004 | Roth et al. |
| 6,829,633 B2 * | 12/2004 | Gelfer et al. ................. 709/203 |
| 6,832,250 B1 | 12/2004 | Coons et al. |
| 6,836,839 B2 | 12/2004 | Master et al. |
| 6,859,434 B2 | 2/2005 | Segal et al. |
| 6,865,664 B2 | 3/2005 | Budrovic et al. |
| 6,871,236 B2 | 3/2005 | Fishman et al. |
| 6,883,084 B1 | 4/2005 | Donohoe |
| 6,894,996 B2 | 5/2005 | Lee |
| 6,901,440 B1 * | 5/2005 | Bimm et al. .................. 709/223 |
| 6,912,515 B2 | 6/2005 | Jackson et al. |
| 6,917,939 B1 * | 7/2005 | Baer et al. .................... 707/10 |
| 6,941,336 B1 | 9/2005 | Mar |
| 6,980,515 B1 | 12/2005 | Schunk et al. |
| 6,985,517 B2 | 1/2006 | Matsumoto et al. |
| 6,986,021 B2 * | 1/2006 | Master et al. ................. 712/15 |
| 6,986,142 B1 | 1/2006 | Ehlig et al. |
| 6,988,139 B1 | 1/2006 | Jervis et al. |
| 7,032,229 B1 | 4/2006 | Flores et al. |
| 7,044,741 B2 | 5/2006 | Leem |
| 7,072,805 B2 * | 7/2006 | Cascaval et al. ............. 702/196 |
| 7,082,456 B2 * | 7/2006 | Mani-Meitav et al. ....... 709/203 |
| 7,139,910 B1 | 11/2006 | Ainsworth et al. |
| 7,142,731 B1 | 11/2006 | Toi |
| 7,249,242 B2 * | 7/2007 | Ramchandran ............. 712/220 |
| 2001/0003191 A1 | 6/2001 | Kovacs et al. |
| 2001/0023482 A1 | 9/2001 | Wray |
| 2001/0029515 A1 | 10/2001 | Mirsky |
| 2001/0034795 A1 * | 10/2001 | Moulton et al. ............. 709/244 |
| 2001/0039654 A1 | 11/2001 | Miyamoto |
| 2001/0048713 A1 | 12/2001 | Medlock et al. |
| 2001/0048714 A1 | 12/2001 | Jha |

| | | | |
|---|---|---|---|
| 2001/0050948 A1 | 12/2001 | Ramberg et al. | |
| 2002/0010848 A1 | 1/2002 | Kamano et al. | |
| 2002/0013799 A1 | 1/2002 | Blaker | |
| 2002/0013937 A1 | 1/2002 | Ostanevich et al. | |
| 2002/0015435 A1 | 2/2002 | Rieken | |
| 2002/0015439 A1 | 2/2002 | Kohli et al. | |
| 2002/0023210 A1 | 2/2002 | Tuomenoksa et al. | |
| 2002/0024942 A1 | 2/2002 | Tsuneki et al. | |
| 2002/0024993 A1 | 2/2002 | Subramanian et al. | |
| 2002/0031166 A1* | 3/2002 | Subramanian et al. | 375/130 |
| 2002/0032551 A1 | 3/2002 | Zakiya | |
| 2002/0035623 A1* | 3/2002 | Lawande et al. | 709/221 |
| 2002/0041581 A1 | 4/2002 | Aramaki | |
| 2002/0042907 A1 | 4/2002 | Yamanaka et al. | |
| 2002/0061741 A1* | 5/2002 | Leung et al. | 455/414 |
| 2002/0069282 A1* | 6/2002 | Reisman | 709/227 |
| 2002/0072830 A1 | 6/2002 | Hunt | |
| 2002/0078337 A1* | 6/2002 | Moreau et al. | 713/1 |
| 2002/0083305 A1 | 6/2002 | Renard et al. | |
| 2002/0083423 A1 | 6/2002 | Ostanevich et al. | |
| 2002/0087829 A1 | 7/2002 | Snyder et al. | |
| 2002/0089348 A1 | 7/2002 | Langhammer | |
| 2002/0101909 A1 | 8/2002 | Chen et al. | |
| 2002/0107905 A1* | 8/2002 | Roe et al. | 709/202 |
| 2002/0107962 A1 | 8/2002 | Richter et al. | |
| 2002/0112240 A1* | 8/2002 | Bacso et al. | 725/47 |
| 2002/0119803 A1 | 8/2002 | Bitterlich et al. | |
| 2002/0120672 A1* | 8/2002 | Butt et al. | 709/202 |
| 2002/0133688 A1 | 9/2002 | Lee et al. | |
| 2002/0138716 A1 | 9/2002 | Master et al. | |
| 2002/0141489 A1 | 10/2002 | Imaizumi | |
| 2002/0147845 A1* | 10/2002 | Sanchez-Herrero et al. | 709/245 |
| 2002/0159503 A1 | 10/2002 | Ramachandran | |
| 2002/0162026 A1 | 10/2002 | Neuman et al. | |
| 2002/0168018 A1* | 11/2002 | Scheuermann | 375/285 |
| 2002/0177167 A1* | 11/2002 | Levinson et al. | 435/7.1 |
| 2002/0181559 A1* | 12/2002 | Heidari-Bateni et al. | 375/148 |
| 2002/0184275 A1 | 12/2002 | Dutta et al. | |
| 2002/0184291 A1 | 12/2002 | Hogenauer | |
| 2002/0184498 A1 | 12/2002 | Qi | |
| 2002/0191790 A1 | 12/2002 | Anand et al. | |
| 2003/0007606 A1* | 1/2003 | Suder et al. | 379/32.04 |
| 2003/0012270 A1 | 1/2003 | Zhou et al. | |
| 2003/0018446 A1 | 1/2003 | Makowski et al. | |
| 2003/0018700 A1 | 1/2003 | Giroti et al. | |
| 2003/0023830 A1 | 1/2003 | Hogenauer | |
| 2003/0026242 A1 | 2/2003 | Jokinen et al. | |
| 2003/0030004 A1 | 2/2003 | Dixon et al. | |
| 2003/0046421 A1* | 3/2003 | Horvitz et al. | 709/238 |
| 2003/0061260 A1 | 3/2003 | Rajkumar | |
| 2003/0061311 A1* | 3/2003 | Lo | 709/220 |
| 2003/0063656 A1 | 4/2003 | Rao et al. | |
| 2003/0074473 A1 | 4/2003 | Pham et al. | |
| 2003/0076815 A1* | 4/2003 | Miller et al. | 370/352 |
| 2003/0099223 A1 | 5/2003 | Chang et al. | |
| 2003/0102889 A1 | 6/2003 | Master et al. | |
| 2003/0105949 A1* | 6/2003 | Master et al. | 713/100 |
| 2003/0110485 A1 | 6/2003 | Lu et al. | |
| 2003/0142818 A1 | 7/2003 | Raghunathan et al. | |
| 2003/0154357 A1 | 8/2003 | Master et al. | |
| 2003/0163723 A1 | 8/2003 | Kozuch et al. | |
| 2003/0171962 A1* | 9/2003 | Hirth et al. | 705/7 |
| 2003/0172138 A1* | 9/2003 | McCormack et al. | 709/220 |
| 2003/0172139 A1* | 9/2003 | Srinivasan et al. | 709/221 |
| 2003/0200538 A1 | 10/2003 | Ebeling et al. | |
| 2003/0212684 A1* | 11/2003 | Meyer et al. | 707/10 |
| 2003/0229864 A1 | 12/2003 | Watkins | |
| 2004/0006584 A1 | 1/2004 | Vandeweerd | |
| 2004/0010645 A1 | 1/2004 | Scheuermann et al. | |
| 2004/0015970 A1 | 1/2004 | Scheuermann | |
| 2004/0025159 A1 | 2/2004 | Scheuermann et al. | |
| 2004/0057505 A1 | 3/2004 | Valio | |
| 2004/0062300 A1 | 4/2004 | McDonough et al. | |
| 2004/0081248 A1* | 4/2004 | Parolari | 375/259 |
| 2004/0093479 A1 | 5/2004 | Ramchandran | |
| 2004/0139297 A1* | 7/2004 | Huppenthal | 712/15 |
| 2004/0168044 A1 | 8/2004 | Ramchandran | |
| 2005/0044344 A1 | 2/2005 | Stevens | |
| 2005/0166038 A1 | 7/2005 | Wang et al. | |
| 2005/0198199 A1 | 9/2005 | Dowling | |
| 2006/0031660 A1* | 2/2006 | Master et al. | 712/15 |

FOREIGN PATENT DOCUMENTS

| | | |
|---|---|---|
| EP | 0 166 586 B1 | 1/1991 |
| EP | 0 236 633 B1 | 5/1991 |
| EP | 0 478 624 B1 | 4/1992 |
| EP | 0 479 102 A2 | 4/1992 |
| EP | 0 661 831 A2 | 7/1995 |
| EP | 0 668 659 A2 | 8/1995 |
| EP | 0 690 588 A2 | 1/1996 |
| EP | 0 691 754 A2 | 1/1996 |
| EP | 0 768 602 A2 | 4/1997 |
| EP | 0 817 003 A2 | 1/1998 |
| EP | 0 821 495 A2 | 1/1998 |
| EP | 0 866 210 A2 | 9/1998 |
| EP | 0 923 247 A2 | 6/1999 |
| EP | 0 926 596 A2 | 6/1999 |
| EP | 1 056 217 A2 | 11/2000 |
| EP | 1 061 437 A1 | 12/2000 |
| EP | 1 061 443 A2 | 12/2000 |
| EP | 1 126 368 A2 | 8/2001 |
| EP | 1 150 506 A2 | 10/2001 |
| EP | 1 189 358 A1 | 3/2002 |
| GB | 2 067 800 A | 7/1981 |
| GB | 2 237 908 A | 5/1991 |
| JP | 62-249456 | 10/1987 |
| JP | 63-147258 | 6/1988 |
| JP | 4-51546 | 2/1992 |
| JP | 7-064789 | 3/1995 |
| JP | 7066718 | 3/1995 |
| JP | 10233676 | 9/1998 |
| JP | 10254696 | 9/1998 |
| JP | 11296345 | 10/1999 |
| JP | 2000315731 | 11/2000 |
| JP | 2001-053703 | 2/2001 |
| WO | WO 89/05029 A1 | 6/1989 |
| WO | WO 89/11443 A2 | 11/1989 |
| WO | WO 91/00238 A1 | 1/1991 |
| WO | WO 93/13603 A1 | 7/1993 |
| WO | WO 95/11855 A1 | 5/1995 |
| WO | WO 96/33558 A1 | 10/1996 |
| WO | WO 98/32071 A3 | 7/1998 |
| WO | WO 99/03776 A1 | 1/1999 |
| WO | WO 99/21094 A2 | 4/1999 |
| WO | WO 99/26860 A1 | 6/1999 |
| WO | WO 99/65818 A1 | 12/1999 |
| WO | WO 00/19311 A1 | 4/2000 |
| WO | WO 00/65855 A1 | 11/2000 |
| WO | WO 00/69073 A1 | 11/2000 |
| WO | WO 01/11281 A1 | 2/2001 |
| WO | WO 01/22235 A1 | 3/2001 |
| WO | WO 01/76129 A2 | 10/2001 |
| WO | WO 02/12978 A2 | 2/2002 |

OTHER PUBLICATIONS

A MATLAB compiler for distributed, heterogeneous, reconfigurable computing systems Banerjee, P.; Shenoy, N.; Choudhary, A.; Hauck, S.; Bachmann, C.; Haldar, M.; Joisha, P.; Jones, A.; Kanhare, A.; Nayak, A.; Periyacheri, S.; Walkden, M.; Zaretsky, D.;, 2000 IEEE Symposium on Apr. 17-19, 2000 pp. 39-48.*

A heterogeneous environment for hardware/software cosimulation Bishop, W.D.; Loucks, W.M.; Simulation Symposium, 1997. Proceedings., 30th Annual Apr. 7-9, 1997 pp. 14-22.*

Re-configurable multi-standard terminal for heterogeneous networks Brakensiek, J.; Oelkrug, B.; Bucker, M.; Uffmann, D.; Droge, A.; Radio and Wireless Conference, 2002. RAWCON 2002. IEEE Aug. 11-14, 2002 pp. 27-30.*

The DAPRA internet: Interconnecting Heterogeneous Computer Networks with Gateways, R.Hinden et al. IEEE 1983.*

Interconnecting Heterogeneous Database Management Systems; V.D. Gligor et al, IEEE 1984.*

Abnous et al., "Ultra-Low-Power Domain-Specific Multimedia Processors," VLSI Signal Processing, IX, 1998, IEEE Workshop in San Francisco, CA, USA, Oct. 30-Nov. 1, 1998, pp. 461-470 (Oct. 30, 1998).

Aggarwal et al., "Efficient Huffman Decoding," International Conference on Image Processing IEEE 1:936-939 (Sep. 10-13, 2000).

Allan et al., "Software Pipelining," ACM Computing Surveys, 27(3):1-78 (Sep. 1995).

Alsolaim et al., "Architecture and Application of a Dynamically Reconfigurable Hardware Array for Future Mobile Communication Systems," Field Programmable Custom Computing Machines, 2000 IEEE Symposium, Napa Valley, Los Alamitos, CA. IEEE Comput. Soc. pp. 205-214 (Apr. 17-19, 2000).

Ashenden et al., "The VHDL Cookbook," Dept. Computer Science, University of Adelaide, South Australia. Downloaded from http://tams-www.informatik.uni-hamburg.de/vhdl/doc/cookbook/VHDL-Cookbook.pdf on Dec. 7, 2006 (Jul. 1990).

Bacon et al., "Compiler Transformation for High-Performance Computing," ACM Computing Surveys 26(4):368-373 (Dec. 1994).

Balasubramonian et al., "Reducing the Complexity of the Register File in Dynamic Superscalar Processors," Proceedings of the 34th Annual ACM/IEEE International Symposium on Microarchitecture, pp. 237-248 (Dec. 1, 2001).

Banerjee et al., "A Matlab Compiler for Distributed, Heterogeneous, Reconfigurable Computing Systems," 2000 IEEE Symposium, pp. 39-48, (Apr. 17-19, 2000).

Bapte et al., "Uniform Execution Environment for Dynamic Reconfiguration," Darpa Adaptive Computing Systems, http://isis.vanderbilt.edu/publications/archive/babty_T_#_0_1999_Uniform_Ex.pdf, pp. 1-7 (1999).

Baumgarte et al., "PACT XPP—A Self-Reconfigurable Data Processing Architecture," NN www.pactcorp.com/sneu/download/ersa01.pdf; retrieved on NOv. 25, 2005 (Jun. 25, 2001).

Becker et al., "An Application-Tailored Dynamically Reconfigurable Hardware Architecture for Digital Baseband Processing," IEEE Conference Proceedings Article pp. 341-346 (Sep. 18, 2000).

Becker et al., "Design and Implementation of a Coarse-Grained Dynamically Reconfigurable Hardware Architecture," VLSI 2001, Proceedings IEEE Computer Soc. Workshop, Piscataway, NJ, USA, pp. 41-46 (Apr. 19-20, 2001).

Bevstar, BevStar Bottled Water Model Advertisement *Automatic Merchandiser* at www.AMonline.com (2005).

Bevstar, BevStar Point of Use Water Model Advertisement *Automatic Merchandiser* at www.AMonline.com (2005).

Bishop & Loucks, "A Heterogeneous Environment for Hardware/Software Cosimulation," Proceedings of the 30th Annual Simulation Symposium, pp. 14-22 (Apr. 7-9, 1997).

Brakensiek et al., "Re-Configurable Multi-Standard Terminal for Hertgeneous Networks," Radio and Wireless Conference, Rawcon 2002 IEEE. pp. 27-30 (2002).

Brown et al., "Quick PDA Data Exchange," PC Magazine pp. 1-3 (May 22, 2001).

Buck et al., "Ptolemy: A Framework for Simulating and Prototyping Heterogeneous Systems," International Journal of Computer Simulation 4:155-182 (Apr. 1994).

Burns et al., "A Dynamic Reconfiguration Run-Time System," Proceedings of the 5th Annual Symposium on Field-Programmable Custom Computing Machines, pp. 1 66-75 (Apr. 16, 1997).

Business Wire, "Whirlpool Internet-Enabled Appliances to Use Beeline Shopper Software Features," http://www.whirlpoocorp.com/news/releases/release.asp?rid=90 (Feb. 16, 2001).

Buttazzo et al., "Optimal Deadline Assignment for Scheduling Soft Aperiodic Tasks in Hard Real-Time Environments," Engineering of Complex Computer Systems, Proceedings of the Third IEEE International Conference on Como, pp. 39-48 (Sep. 8, 1997).

Callahan et al., "Adapting Software Pipelining for Reconfigurable Computing," in Proceedings of the International Conference on Compilers, Architectrue and Synthesis for Embedded Systems p. 8, ACM (CASES '00, San Jose, CA) (Nov. 17-18, 2000).

Chapman & Mehrotra, "OpenMP and HPF: Integrating Two Paradigms," Proceedings of the 4th International Euro-Par Conference (Euro-Par'98), Springer-Verlag Heidelberg, Lecture Notes in Computer Science 1470:650-658 (1998).

Chen et al., "A Reconfigurable Multiprocessor IC for Rapid Prototyping of Algorithmic-Specific High-Speed DSP Data Paths," IEEE Journal of Solid-State Circuits, IEEE 35:74-75 (Feb. 1, 2001).

Clarke, "Embedded Solutions Enters Development Pact with Marconi," EETimes Online (Jan. 26, 2000).

Compton & Hauck, "Reconfigurable Computing: A Survey of Systems and Software," ACM Press, ACM Computing Surveys (CSUR) 34(2):171-210 (Jun. 2002).

Compton et al., "Configuration Reaction and Defragmentation for Run-Time Reconfigurable Computing," Northwestern University, http://citeseer.nj.nec.com/compton00configuration.html, pp. 1-17 (2000).

Conte et al., "Dynamic Rescheduling: A Technique for Object Code Compatibility in VLIW Architectures," Proceedings of the 28th Annulal International Symposium on Microarchitecture pp. 208-218 (Nov. 29, 1995).

Conte et al., "Instruction Fetch Mechanisms for VLIW Architectures with Compressed Encodings," Proceedings of the Annual IEEE/ACM International Symposium on Microarchitecture (MICRO) 29:201-211 (Dec. 2, 1996).

Cray Research Inc., "Cray T3E Fortran Optimization Guide," Ver. 004-2518-002, Section 4.5 (Jan. 1999).

Cummings et al., "FPGA in the Software Radio," IEEE Communications Magazine. 37(2):108-112 (Feb. 1999).

Dandalis et al., "An Adaptive Cryptographic Engine for IPSec Architectures," IEEE pp. 132-141 (Jan. 2000).

David et al., "DART: A Dynamically Reconfigurable Architecture Dealing with Future Mobile Telecommunication Constraints," Proceedings of the International Parallel and Distributed Processing Symposium pp. 156-163 (Apr. 15, 2002).

Deepakumara et al., "FPGA Implementation of MD5 has Algorithm," Canadian Conference on Electrical and Computer Engineering, IEEE (2001).

Dehon et al., "Reconfigurable Computing: What, Why and Implications for Design Automation," Design Automation Conference Proceedings pp. 610-615 (1999).

Dipert, "Figuring Out Reconfigurable Logic," EDN 44(16):107-114 (Aug. 5, 1999).

Dominikus, "A Hardware Implementation of MD4-Family Hash Algorithms," 9th International Conference on Electronics, Circuits and Systems IEEE (2002).

Dorband, "aCe C Language Reference Guide," Online (Archived Mar. 2001), http:/ / web.archive.org/web/20000616053819/http://newton.gsfc.nasa.gov/aCe/aCe_dir/aCe_cc_Ref.html (Mar. 2001).

Drozdowski "Scheduling Multiprocessor Tasks—An Overview," Instytut Informatyki Politechnika, pp. 1-31 (Jan. 31, 1996).

Ebeling et al., "RaPiD Reconfigurable Pipelined Datapath," Springer-Verlag, 6th International Workshop on Field-Programmable Logic and Applications pp. 126-135 (1996).

Fawer et al., "A Multiprocessor Approach for Implementing a Time-Diversity Spread Spectrum Receiver," Proceeding sof the 1990 International Zurich Seminal on Digital Communications, pp. 173-180 (Mar. 5-8, 1990).

Fisher, "Gone Flat," Forbes pp. 76-79 (Oct. 2001).

Fleischmann et al., "Prototyping Networked Embedded Systems," Integrated Engineering, pp. 116-119 (Feb. 1999).

Forbes "Best of the Web—Computer Networking/Consumer Durables," *The Forbes Magnetic 40* p. 80 (May 2001).

Gibson, "Fresh Technologies Will Create Myriad Functions," FT Information Technology Review; World Wide Web at http://technews.acm.org/articles/2000-2/0301w.html?searchterm=%22fresh+technologies%22 (Mar. 1, 2000).

Gluth, "Integrierte Signalprozessoren," Elektronik 35(18):112-118 Franzis Verlag GMBH, Munich, Germany (Sep. 5, 1986).

Gokhale & Schlesinger, "A Data Parallel C and Its Platforms," Proceedings of the Fifth Symposium on the Frontiers of Massively Parallel Computation pp. 194-202 (Frontiers '95) (Feb. 1995).
Grimm et al., "A System Architecture for Pervasive Computing," Washington University, pp. 1-6 (Sep. 2000).
Halbwachs et al., "The Synchronous Data Flow Programming Language LUSTRE," Proceedings of the IEEE 79(9):1305-1319 (Sep. 1991).
Hammes et al., "Cameron: High Level Language Compilation for Reconfigurable Systems," Proc. of the Intl. Conf. on Parallel Architectures and Compilation Techniques, pp. 236-244 (Oct. 1999).
Hartenstein, "Coarse Grain Reconfigurable Architectures," Design Automation Conference, 2001. Proceedings of the ASP-Dac 2001, Asian and South Pacific Jan. 30, 2001-Feb. 2, 2001, Piscataway, Nj, US, IEEE, pp. 564-569 (Jan. 30, 2001).
Heinz, "An Efficiently Compilable Extension of {M}odula-3 for Problem-Oriented Explicitly Parallel Programming," Proceedings of the Joint Symposium on Parallel Processing (May 1993).
Hinden et al., "The DARPA Internet: Interconnecting Heterogeneous Computer Networks with Gateways," IEEE Computer Magazine pp. 38-48 (1983).
Horton, "Beginning Java 2: JDK 1.3 Edition," Wrox Press, Chapter 8, pp. 313-316 (Feb. 2001).
Huff et al., "Lifetime-Sensitive Modulo Scheduling," 6th Conference on Programming Language, Design and Implementation, pp. 258-267, ACM (1993).
IBM, "Multisequencing a Single Instruction Stream Scheduling with Space-time Trade-offs," IBM Technical Disclosure Bulletin 36(2):105-108 (Feb. 1, 1993).
IEEE, "IEEE Standard Verilog Hardware Description Language," downloaded from http://inst.eecs.berkeley.edu/~cs150/fa06/Labs/verilog-ieee.pdf on Dec. 7, 2006 (Sep. 2001).
Internet Wire, Sunbeam Joins Microsoft in University Plug and Play Forum to Establish A "Universal" Smart Appliance Technology Standard (Mar. 23, 2000).
Ishii et al., "Parallel Variable Length Decoding with Inverse Quantization for Software MPEG-2 Decoders," Workshop on Signal Processing Systems, Design and Implementation, IEEE pp. 500-509 (Nov. 3-5, 1997).
Isoworth, "Isoworth Beverage Dispensing Technology Worldwide Company," Brochure (May 22, 2000).
Jain et al., "An Alternative Approach Towards the Design of Control Units," Microelectronics and Reliability 24(6):1009-1012 (1984).
Jain, "Parallel Processing with the TMS320C40 Parallel Digital Signal Processor," Sonitech International Inc., pp. 13-46. Retrieved from: http://www-s.ti.com/sc/psheets/spra031/spra031.pdf retrieved on Apr. 14, 2004 (Feb. 1994).
Janssen et al., "Partitioned Register File for TTAs," Proceedings of the 28th Annual International Symposium on Microarchitecture, pp. 303-312 (Nov. 1995).
Jong-Pyng et al., "Real-Time Virtual Channel Flow Control," Proceedings of the Annual International Phoenix Conference on Computers and Communications, Conf. 13, pp. 97-103 (Apr. 12, 1994).
Jung et al., "Efficient Hardware Controller Synthesis for Synchronous Dataflow Graph in System Level Design," Proceedings of the 13th International Symposium on System Synthesis pp. 79-84 (ISSS'00) (Sep. 2000).
Kaufmann et al., "Digital Spread-Spectrum Multipath-Diversity Receiver for Indoor Communication," from Pioneers to the 21st Century; Denver, Proceedings of the Vehicular Technology Socity [sic] Conference, NY, IEEE, US 2(Conf. 42):1038-1041 (May 10-13, 1992).
Kneip et al., "An Algorithm Adapted Autonomous Controlling Concept for a Parallel Single-Chip Digital Signal Processor," Journal of VLSI Signal Processing Systems for Signal, Image, an dVideo Technology 16(1):31-40 (May 1, 1997).
Lee & Messerschmitt, "Pipeline Interleaved Programmable DSP's: Synchronous Data Flow Programming," IEEE Transactions on Acoustics, Speech, and Signal Processing ASSP-35(9):1334-1345 (Sep. 1987).
Lee & Messerschmitt, "Synchronous Data Flow," Proceedings of the IEEE 75(9):1235-1245 (Sep. 1987).
Lee & Parks, "Dataflow Process Networks," Proceedings of the IEEE 83(5):773-799 (May 1995).
Liu et al., "Scheduling Algorithms for Multiprogramming in a Hard-Real-Time Environment," Journal of the Association for Computing 20(1):46-61 (1973).
Llosa et al., "Lifetome-Sensitive Modulo Scheduling in a Production Environment," IEEE Trans. on Comps. 50(3):234-249 (Mar. 2001).
Lu et al., "The Morphosys Dynamically Reconfigurable System-On-Chip," Proceedings of the First NASA/DOD Workshop on Evolvable Hardware, pp. 152-160 (Jul. 19, 1999).
Mangione-Smith et al., "Seeking Solutions in Configurable Computing," Computer 30(12):38-43 (Dec. 1997).
Manion, "Network CPU Adds Spice," Electronic Engineering Times, Issue 1126 (Aug. 14, 2000).
Mascia & Ishii., "Neural Net Implementation on Single-Chip Digital Signal Processor," IEEE (1989).
McGraw, "Parallel Functional Programming in Sisal: Fictions, Facts, and Future," Lawrence Livermore National Laboratory pp. 1-40 (Jul. 1993).
Najjar et al., "High-Level Language Abstraction for Reconfigurable Computing," Computer 36(8):63-69 (Aug. 2003).
Nichols et al., "Data Management and Control-Flow Constructs in a SIMD/SPMD Parallel Language/Compiler," Proceedings of the 3rd Symposium on the Frontiers of Massively Parallel Computation pp. 397-406 (Oct. 1990).
OpenMP Architecture Review Board, "OpenPM C and C++ Application Program Interface," pp. 7-16 (Oct. 1998).
Oracle Corporation, "Oracle8i JDBC Developer's Guide and Reference," Release 3, 8.1.7, pp. 10-8-10-10 (Jul. 2000).
Pauer et al., "Algorithm Analysis and Mapping Environment for Adaptive Computing Systems: Further Results," Proc. IEEE Symposium on FPGA's for Custom Computing Machines (FCCM), Napa CA (1999).
Pauer et al., "Algorithm Analysis and Mapping Environment for Adaptive Computing Systems," Presentation slides, Third Bi-annual Ptolemy Miniconference (1999).
Ramamritham et al., "On Sheduling Algorithms for Real-Time Mutliprocessor Systems," Algorithms and Applications, Proceedings of the International conference on Parallel Processing 3:143-152 (Aug. 8, 1989).
Schneider, "A Parallel/Serial Trade-Off Methodology for Look-Up Table Based Decoders," Proceedings of the Design Automation Conference 34:498-503 (Jun. 9-13, 1997).
Sidhu et al., "A Self-Reconfigurable Gate Array Architecture," 10 International Workshop on Field Programmable Logic and Applications http://coblitz.codeen.org:3125/citeseer.psu/cache/papers/cs/17524/http:zSzzSzmaarcii.usc.eduzSzPublicationsZSzsidhu_fp100.pdf/sidhu00selfreconfigurable.pdf retrieved on Jun. 21, 2006 (Sep. 1, 2001).
Smith, "Intro to ASICs: ASIC Cell Libraries," at http://iroi.seu.edu.cn/books/asics/Book2/CH01/CH01.5.htm, printed on Feb. 4, 2005 (Jun. 1997).
Souza, "Computing's New Face—Reconfigurable Devices Could Rattle Supply Chain," Electronic Buyers' News Issue 1205, p. P.1 (Apr. 3, 2000).
Souza, "Quicksilver Buys White Eagle," Electronic Buyers News, Issue 1220 (Jul. 17, 2000).
Sriram et al., "MPEG-2 Video Decoding on the TMS320C6X DSP Architecture," Conference Record of the 32nd Asilomar Conference on Signals, Systems, and Computers, IEEE pp. 1735-1739 (Nov. 1-4, 1998).
Steiner, "Coke Chief's Latest Daft Idea—A Cola Tap in Every House," Sunday Times (Mar. 2001).
Sun Microsystems, "Fortran 3.0.1 User's Guide, Revision A," pp. 57-68 (Aug. 1994).
Svensson, "Co's Join On Home Web Wiring Network," Associated Press Online printed on Apr. 30, 2008 (Jun. 2000).
Tang et al., "Thread Partitioning and Scheduling Based on Cost Model," Proceedings of the Ninth Annual ACM Symposium on Parallel Algorithms and Architectures, pp. 272-281 Retrieved from: http://doi.acm.org/10.1145/258492.2585 retrieved on Aug. 25, 2004 (1997).

Vaya, "VITURBO: A Reconfigurable Architecture for Ubiquitous Wireless Networks," A Thesis Submitted in Partial Fulfillment of the Requirements for the Degree Master of Science; RICE University (Aug. 2002).

Wang et al., "Cell Search in W-CDMA," IEEE Journal on Selected Areas in Communications 18(8):1470-1482 (Aug. 2000).

Wardell, "Help for Hurried Cooks?, " Popular Science, p. 32 (May 2000).

Whiting & Pascoe, "A History of Data-Flow Languages," IEEE Annals of the History of Computing 16(4):38-59 (1994).

Williamson & Lee, "Synthesis of Parallel Hardware Implementations from Synchronous Dataflow Graph Specifications," Conference Record of the Thirtieth Asilomar Conference on Signals, Systems and Computers 1340-1343 (Nov. 1996).

Wirthlin et al., "A Dynamic Instruction Set Computer," Proceedings of the IEEE Symposium on FPGS's for Custom Computing Machines, pp. 99-107 (Apr. 21, 1995).

WWW.APPLIANCEMAGAZINE.COM, World Wide Web at http://web.archive.org/web/20000511085402/http://www.appliancemagazine.com/ printed on Apr. 30, 2008.

www.bestrom.com, BreakMateTM from www.bestrom.com printed on Apr. 29, 2008.

www.beverageexpress.com, Beverage Express from www.beverageexpress.com printed on Apr. 30, 2008.

www.bevstar.com, Isoworth Beverage Dispensing Technology Worldwide from www.bevstar.com printed on Apr. 30, 2008.

www.bonator.com, from The World Wide Web at http://web.archive.org/web/20000510102440/http://www.bonator.com/ printed on Apr. 30, 2008.

www.ecommerce.dewpointinc.com, Swiss Mountain Coffees from www.ecommerce.dewpointinc.com printed on Apr. 30, 2008.

www.gateway.com, World Wide Web, http://web.archive.org/web/20000229192734/www.gateway.com/productpages/9300splash/index.shtml Available on Mar. 3, 2000, 1 page (Mar. 3, 2000).

www.icl.com, from the World Wide Web at http://www.icl.com printed on Apr. 30, 2008.

www.margherita2000.com; from Margherita2000.com printed Apr. 30, 2008 (Jan. 26, 2001).

www.sodaclubenterprises.com, Soda-Club Enterprises from www.sodaclubenterprises.com printed on Apr. 30, 2008.

www.symbol.com, Symbol from www.symbol.com printed on Apr. 30, 2008.

www.wunderbar.com, Wunder-Bar Dispensing Systems from www.wunderbar.com printed on Apr. 30, 2008.

Xilinx, "Virtex-II Pro Platform FPGAs: Functional Description DS083-2 (v2.5)," Product Specification, pp. 13-46 (Jan. 20, 2003).

Young, "Architecture Powers up IPSec, SSL," EETimes, Los Gatos, CA, pp. 1-4 http://www.eetimes.com/story/OEG20011102S0065 (Nov. 2, 2001).

Yuan et al., "A Decomposition Approach to Non-Preemptive Real-Time Scheduling," Real Time Systems 6(1):7-35 (1994).

Zaino et al., "Algorithm Analysis and Mapping Environment for Adaptive Computing Systems," Final Technical Report, DARPA Contract F33615-97-C-1174 (Sep. 2001).

Zhang et al., "A 1 V Heterogeneous Reconfigurable Processor IC for Baseband Wireless Applications," 2000 IEEE Solid.

Altera Apex 20K 1999.

Andraka Consulting Group, "Distributed Arithmetic, " Obtained from: http://www.fpga-guru.com/distribu.htm (1998-2000).

Hanna et al., "A Normalized Backpropagation Learning Algorithm for Multilayer Feed-Forward Neural Adaptive Filters, " *Neural Networks for Signal Processing XI*, Proceedings of the 2001 IEEE Signal Processing Society Workshop pp. 63-72 (Sep. 2001).

Janweijer et al., "A Compact Robin Using the SHarc (CRUSH), " Obtained from: http://www.nikhef.nl/~peterj/Crush/CRUSH-hw.pdf (Sep. 1998).

Rajagopalan et al., "A Flexible Multiplication Unit for an FPGA Logic Block, " *Circuits and Systems* 4:546-9 (2001).

Xilinx Data Book 1998.

Xilinx Virtex 1.1 1998.

Xilinx Virtex 2.2 2000.

* cited by examiner

STORAGE AND DELIVERY OF DEVICE FEATURES

CROSS-REFERENCE TO RELATED APPLICATIONS

This application is related to the following co-pending applications:

(1) U.S. patent application Ser. No. 09/815,122, filed on Mar. 22, 2001, entitled "ADAPTIVE INTEGRATED CIRCUITRY WITH HETEROGENEOUS AND RECONFIGURABLE MATRICES OF DIVERSE AND ADAPTIVE COMPUTATIONAL UNITS HAVING FIXED, APPLICATION SPECIFIC COMPUTATIONAL ELEMENTS";

(2) U.S. patent application Ser. No. 09/998,006, filed on Nov. 28, 2001, entitled "SYSTEM FOR AUTHORIZING FUNCTIONALITY IN ADAPTABLE HARDWARE DEVICES"; and (3) U.S. patent application Ser. No. 10/013,825 filed on Dec. 10, 2001, entitled "SYSTEM FOR CONFIGURING DEVICE STANDARDS AFTER MANUFACURE".

Each of the above applications are hereby incorporated by reference as if set forth in full in this document.

BACKGROUND OF THE INVENTION

This invention relates in general to configuring hardware devices to achieve desired functionality and more specifically to maintaining records of permitted functions or features and providing the functions or features to an adaptable device.

Traditional consumer electronic devices have substantially fixed functionality. Devices such as cell phones, digital audio players, personal digital assistants (PDAs), global positioning satellite (GPS) terminals, etc. are designed from scratch and manufactured and marketed as a specific type of device with a specific feature set. Such fixed function devices can be problematic when the data formats, processing requirements or other functions of the device must be changed in order for the device to be useful, or even useable, in e.g., different geographic locations, at a later point in time, etc. Functions not envisioned at design time are difficult to add on later.

For example, a user who purchases a cell phone in the United States might have to travel to a European country. The code-division multiplexed device (CDMA, cdmaOne, etc.) obtained in the U.S. may not be compatible with a European cellular system such as Global System for Mobile Communications (GSM). Features such as caller ID, call waiting, etc., might not use the same data identification, communication protocols, processing and signal standards, etc. Standards also change with time so that a device, such as a CDMA cell phone, might be incompatible with later developments such as future web-enabled telephone standards. For example, the 1595B CDMA standard vs. the HDR CDMA data standard.

Another problem with fixed function devices is that users must typically buy different devices to perform different functions. For example, a user might need a cell phone, digital audio device and pager. This would typically require a user to carry three separate electronic devices. Often users purchase devices with features that they have little need for. Other users may obtain the same devices and discover that there are features that they would like to have that the device can't perform. Since manufacturers must design a single device to mass market, it is inevitable that most users will not have a good match between features that they want or need. This is especially true since the users' wants and needs often change over time and place. Similarly, standards, such as MPEG-2, 3, 4, and 5; evolve and vary over time and place.

A typical approach of today's manufacturers is to load a device with many features. However, this adds to the cost of the device for most user's who will never use many of the features.

Figure 3:
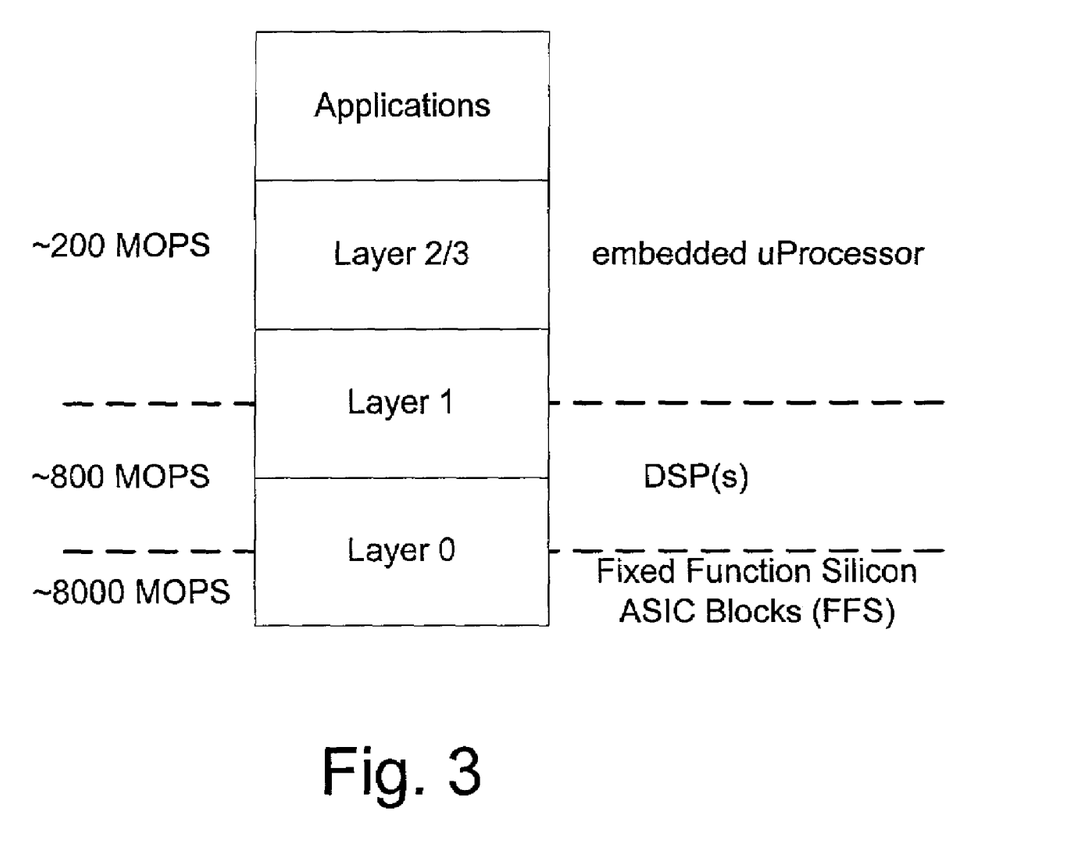
FIG. 3 illustrates a traditional approach to device design.

A traditional approach to device design is illustrated in FIG. 3. About 90% of the million operations per second (MOPS) of a typical mobile electronics design resides in a lowest "layer 0" implemented with fixed function silicon (FFS) accelerators. Digital signal processing (DSP) is used in the upper portion of layer 0 and the lower portion of layer 1. In a typical design the DSP circuitry may be utilized 95%, or more, of the time. This leaves few DSP MOPS available for other features, changes in requirements, etc. The FFS are usually all point solutions with no flexibility to reallocate their use.

SUMMARY OF THE INVENTION

An embodiment of the present invention uses an adaptable computing machine (ACM) approach. Many of the FFS, DSP and general purpose CPU, RISC or other computing is replaced with ACM architecture. This approach provides a system for permitting new, or enhanced, functionality to be transferred to an adaptable device. In a preferred embodiment, the permitted functionality is determined according to an accounting method associated with a user's account. This approach allows a user to contract for specific services, functionality, etc. regardless of changes over time such as changes to data formats, communication protocols, external devices or infrastructure, etc. The sources for these contracts can be either servers, the device itself, or other devices in peer-to-peer, client/server, or other arrangements.

For example, a cell phone user can contract for phone services. The user's handset is an adaptable device that can obtain new functionality from a primary company to ensure that the user is able to operate the cell phone in different countries of the world, or in different regions where the cellular communication mode may be different. Also, as underlying technology changes over time, the user's phone device can be updated. User's can negotiate for different features sets such as caller ID, conference calling, data rates, voice quality, priority rates, etc. They can even make trade-offs such as battery life for quality of communication channel, speed of connection for cost, etc.

In a preferred embodiment, the functionality is stored as binary information on a ubiquitous communications network such as the Internet. Functionality is transferred to different devices as digital information over the network. This allows hardware functionality to be used, licensed or sold in many forms. For example, site licenses can be obtained for companies; hardware "trialware" can be provided to allow limited functionality for a limited time for lower-cost payments, etc.

In one embodiment, the invention provides a method for delivering adaptation information to an adaptable hardware device. The method includes defining permitted functionality for a given device; receiving a request to provide functionality for the given device; checking whether the permitted functionality includes the requested functionality; and if the permitted functionality includes the requested functionality then providing the requested functionality to the given device.

DESCRIPTION OF A PREFERRED EMBODIMENT

A preferred embodiment of the invention allows adaptation information to be transferred over an electronic communication system, such as a point-to-point link, data network, etc. In the preferred embodiment, the Internet is used to accomplish the transfer. The adaptation information is used to load new functionality into a portable consumer electronic device. For example, the functionality can allow the device to perform cellular telephone operations, audio playback, global positioning satellite (GPS) receiver functions, etc. Although the present application is presented primarily with respect to consumer electronic devices and relevant standards, aspects of the invention can be used with other types of electronic devices and other standards, licensed technology or functionality.

Naturally, any type of system can be used to transfer information to the device, such as transferring from local or remote devices, peer-to-peer exchanges, client/server exchanges, etc.

A preferred embodiment of the invention uses a device including an adaptive computing engine (ACE). The preferred architecture of the device is described in detail in the co-pending patent application referenced above, entitled "ADAPTIVE INTEGRATED CIRCUITRY WITH HETEROGENEOUS AND RECONFIGURABLE MATRICES OF DIVERSE AND ADAPTIVE COMPUTATIONAL UNITS HAVING FIXED, APPLICATION SPECIFIC COMPUTATIONAL ELEMENTS." It should be apparent that any type of adaptable hardware device design is adaptable for use with the present invention. For example, the adaptable device can be any type of adaptable device using other architectures or design methodologies, such as a device using a general-purpose processor, multiprocessing, application-specific integrated circuit (ASIC), field-programmable gate array (FPGA), dedicated circuitry, etc., or combination of the foregoing.

The adaptable device can be configured with a desired standard, or other functionality, at the point of initial shipping of the device, at the site of manufacture, or at any point in the design, manufacture, distribution, sales chains, including after the point of sale. The device can be configured by adaptation information loaded into the device by any type of communication means such as reading magnetic media, using a digital network such as a local-area network (LAN), the Internet; using a hardwire transfer, using optical or radio-frequency communication, etc.

Adaptation of the device can include the means described in co-pending U.S. patent application entitled "SYSTEM FOR AUTHORIZING FUNCTIONALITY IN CONFIGURABLE HARDWARE DEVICES," referenced, above.

Figure 1:
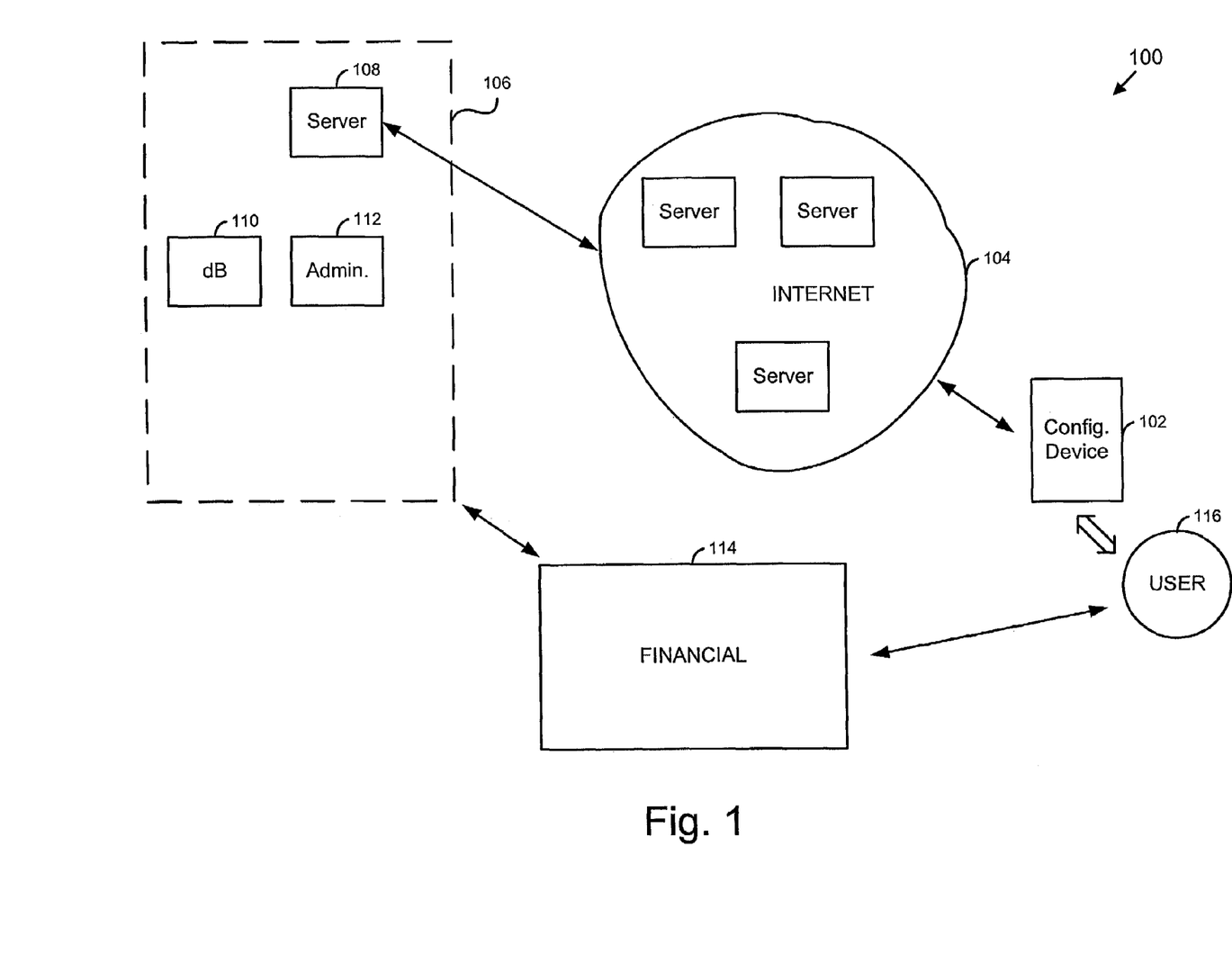
FIG. 1 illustrates transfer of adaptation information to an adaptable device.

FIG. 1 illustrates basic operation of the system of the present invention.

In FIG. 1, system 100 includes an adaptable device 102. The device is preferably capable of communication with a ubiquitous digital transfer system such as Internet 104. The amorphous Internet can use a variety of servers, workstation, databases, routers, switches, communication links, other devices (including adaptable devices), etc.

FIG. 1 also shows primary company 106 housing front-end server 108, database 110 and administration control 112. In one embodiment, each device, such as device 102 is associated with a human user, corporate identity or some other identifiable entity that is capable of being billed for services or functionality provided by primary company 106 for the device.

Billing, or other forms of accounting for provision or use of functionality, can be by any of the forms (or additional forms) discussed in the related applications. FIG. 1 shows a generalized relationship to bill user 116 via a banking service 114 of which primary company 106 receives information. Naturally, billing information can occur directly between user 116 and the primary company. Or other entities can be involved. Although billing information transfer is shown external to Internet 104, the billing information transfer can be by any means such as by using financial sector communications or other dedicated, or shared, links.

A preferred embodiment associates a device, such as device 102, with a user of the device, such as user 102, in database 110. The user of the device does not have to be the responsible billing entity, such as where a company pays for device usage for the company's employees. The device is associated with a list, or range, or permitted functionality. Such a list can also be stored in database 110. Note that any of the processing, data storage, and other elements of operation of the system can be performed at any point in the connected network or in any components of the system. Thus, for example, a database of devices and permitted functionality can be stored on a server in the Internet, in the banking service's facilities, etc.

Once permitted functionality is associated with a device, the functionality can be provided to the user of the device regardless of geographic location and regardless of future changes in technology, standards, or other relied-upon interfaces, protocols, data formats, standards, etc.

For example, if a user of device 102 has contracted for cellular phone functionality and the user (and device) are in the U.S. then the device is provided with appropriate cell phone functionality (e.g., CDMA, TDMA, analog, satellite, etc.) as needed. If the user moves into an area where, e.g., currently programmed TDMA functionality residing in the device is not supported, but CDMA functionality is available from the cell phone infrastructure, then device 102 notifies primary company 106 that CDMA functionality is requested to continue to provide phone functionality. The request is sent via Internet 104 to primary company 106. Primary company's server 108 (or another device such as a mobile adaptive device) receives the request and communicates the request to administrator control 112.

Administrator control 112 can involve human monitoring and approval, or can be automatic. Administrator control 112 consults database 110 to determine whether the account associated with device 102 permits the requested functionality. If so, the appropriate functionality, in the form of adaptation information, is transferred from server 108 to Internet 104 and to device 102. This approach can guarantee that device 102 works at any geographic location where a type of wireless telephone service is available. Even different communication means such as analog radio-frequency such as citizen's band, HAM, analog telephone, voice-over-Internet Protocol (VoIP), etc. can be permitted. Devices that assist this function can be credited for providing transfer assistance, information or other resources. Such credit can be a money payment, credit, or other provision or promise to provide resources or items of value. For example, adaptation information can be provided as a credit.

Similar to geographic independence, functionality can be maintained over time despite changes in infrastructure, standards, data formats or other relied-upon technology. Exchanging the device, or handset, is not required to maintain functionality in the face of data, protocol or service changes. Unlike the prior art, a primary company is able to guarantee broad types of functionality over time periods and/or over regions.

Naturally, any type of functionality can be used with the present system. For example, video formats are different in different parts of the world (e.g., NTSC, PAL). Also, there are many different video formats even within a given country such as analog or digital. In general, the system of the present invention can provide hardware and software independent functionality. Instead, functionality can be used, licensed, or sold in broad, tailored ways to individual users, businesses, etc., as desired.

Permitted functionality can be almost any arrangement rather than the geographic and time-independent versions discussed, above. For example, a user's account can provide for the ability to play any audio format. The permission can place limits on bandwidth, or audio quality. Add on peripherals to an adaptable device can allow playback of audio through two channels, three-dimensional audio, 5.1 surround sound, etc. Such peripherals can be detected by the device and their existence can be indicated to the primary company, or other adaptation information provider, so that appropriate adaptation information is provided.

A user can be permitted to, e.g., have a conference call with up to 5 other devices. Such permission can be shared among users in a group as where a company has a license so that, at any given time, 20 sets of 5-way conference calls can be in use. Any variety and combination of permitted functionality can be licensed in any number of ways. Individual, or site licenses can be provided which, in turn, spawns many different possibilities for pricing and payment schedules or arrangements.

Since the functionality is stored on the Internet. Internet techniques for marketing, distribution and use can be employed. For example, functions can be provided as "trialware" for a temporary period, free of charge, or otherwise. The user can then elect to purchase the full functionality on a time-measured, or other basis. Notification of functions or services can be passed among different devices, sites, nodes, users, machines, etc., on a network by any means. Unlike traditional computer systems on the Internet, upgrades to features can be automatically provided without requiring user action every time new adaptation information is loaded into the device.

Figure 2:
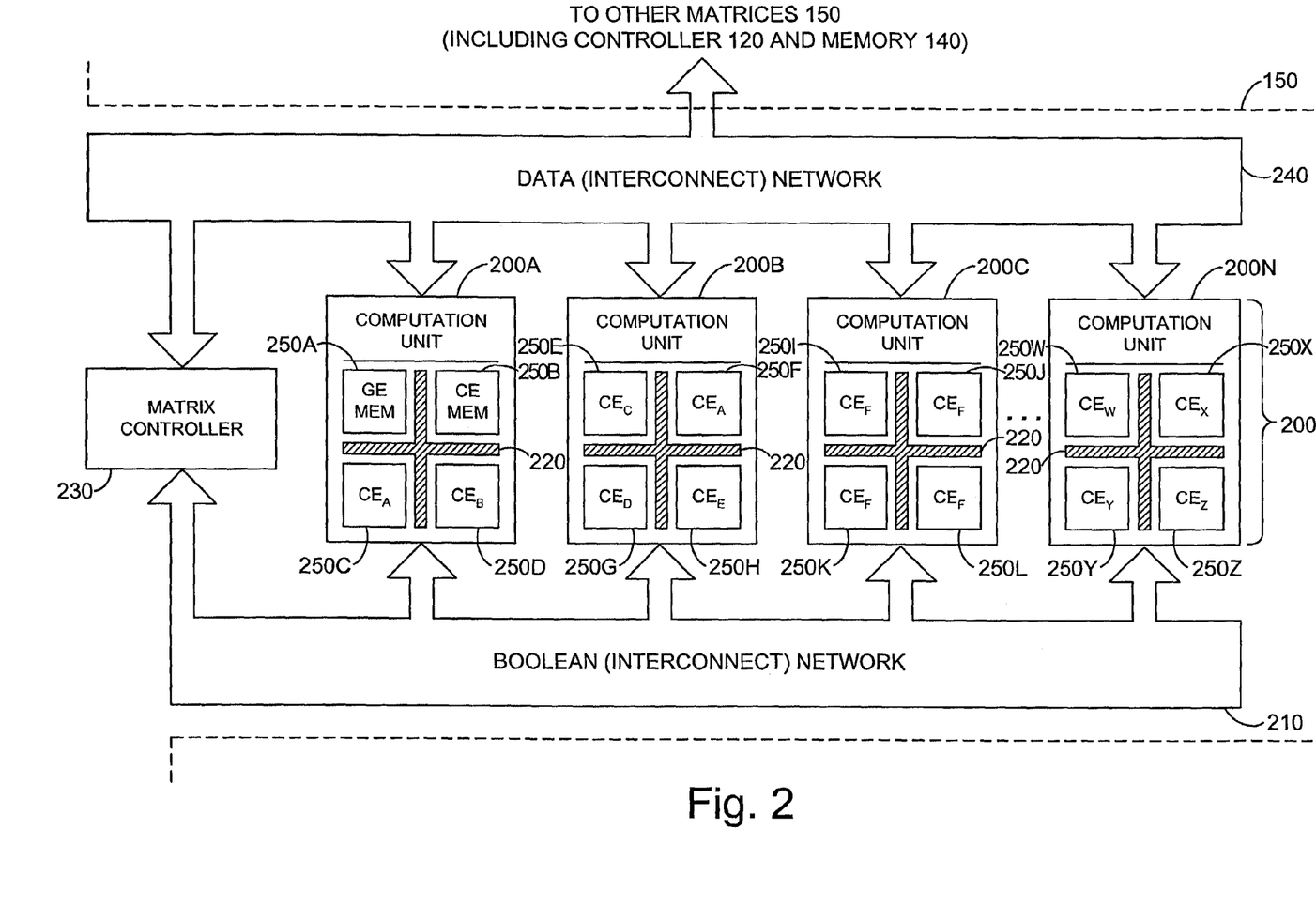
FIG. 2 illustrates basic parts of an adaptable device architecture based on an adaptive computing environment.

FIG. 2 illustrates basic parts of an adaptable device architecture based on an adaptive computing environment (ACE) approach. Such an approach is discussed in detail in the co-pending patent application referenced, above. A preferred embodiment of an adaptable device is achieved by using a plurality of heterogeneous computational elements coupled to an interconnection network. The ACE architecture uses small processing elements called nodes, or matrices. The matrices are each designed to be specialized in one basic type of processing such as arithmetic, bit manipulation, finite state machine, memory oriented or reduced instruction set computing (RISC) approaches. The matrices are provided with adaptable interconnection networks. A scheduler performs the task of mapping an operation, or function, onto the matrices. Once mapped, the function can execute for a while before a next function is mapped onto the same set of matrices. In this manner, the functionality of a device that includes the matrices can be changed quickly and efficiently.

In FIG. 2, reconfigurable matrix 150 includes a plurality of computation units 200 (illustrated as computation units 200A through 200N). Computation units include a plurality of computational elements 250 (illustrated as computational elements 250A through 250Z). As illustrated in FIG. 2, matrix 150 generally includes a matrix controller 230 and plurality of computation (or computational) units 200 as logical or conceptual subsets or portions of a matrix interconnect network. Also shown are data interconnect network 240 and Boolean interconnect network 210. Interconnect networks can have different levels of interconnectivity and flexibility for greater levels of adaptability and adaptation. In an applied architecture, the matrix represented by FIG. 2 is replicated within a single chip, or chipset, and interconnected with each other to provide a scalable approach to providing processing resources. A network interconnecting matrices (not shown) is referred to as a matrix interconnection network.

Boolean interconnect network 210 provides adaptation and data interconnection capability between and among the various computation units 200, and is preferably small (i.e., only a few bits wide). Data interconnect network 240 provides the adaptation and data interconnection capability for data input and output between and among the various computation units 200, and is preferably comparatively large (i.e., many bits wide). It should be noted, however, that while conceptually divided into adaptation and data capabilities, any given physical portion of the matrix interconnection network, at any given time, may be operating as either the Boolean interconnect network 210, the data interconnect network 240, the lowest level interconnect 220 (between and among the various computational elements 250), or other input, output, or connection functionality.

Continuing to refer to FIG. 2, included within a computation unit 200 are a plurality of computational elements 250, illustrated as computational elements 250A through 250Z (individually and collectively referred to as computational elements 250), and additional interconnect 220. The interconnect 220 provides the reconfigurable interconnection capability and input/output paths between and among the various computational elements 250. As indicated above, each of the various computational elements 250 consist of dedicated, application specific hardware designed to perform a given task or range of tasks, resulting in a plurality of different, fixed computational elements 250. Utilizing the interconnect 220, the fixed computational elements 250 may be reconfigurably connected together into adaptive and varied computational units 200, which also may be further reconfigured and interconnected, to execute an algorithm or other function, at any given time, utilizing the interconnect 220, the Boolean network 210, and the matrix interconnection network (not shown).

In a preferred embodiment, the various computational elements 250 are designed and grouped together, into various adaptive and reconfigurable computation units 200. In addition to computational elements 250 which are designed to execute a particular algorithm or function, such as multiplication or addition, other types of computational elements 250 are also utilized. As illustrated in FIG. 2, computational elements 250A and 250B implement memory, to provide local memory elements for any given calculation or processing function (compared to more "remote" or auxiliary memory that can be external to the matrix). In addition, computational elements 250I, 250J, 250K and 250L are configured to implement finite state machines to provide local processing capability especially suitable for complicated control processing.

With the various types of different computational elements 250 that may be available, depending upon the desired functionality, the computation units 200 may be loosely categorized. A first category of computation units 200 includes computational elements 250 performing linear operations, such as multiplication, addition, finite impulse response filtering, and so on. A second category of computation units 200 includes computational elements 250 performing non-linear operations, such as discrete cosine transformation, trigonometric calculations, and complex multiplications. A third type of computation unit 200 implements a finite state machine, such as computation unit 200C as illustrated in FIG. 2, particularly useful for complicated control sequences, dynamic scheduling, and input/output management, while a fourth type may implement memory and memory management, such as computation unit 200A. Lastly, a fifth type of computation unit 200 may be included to perform bit-level manipulation, such as for encryption, decryption, channel coding, Viterbi decoding, and packet and protocol processing (such as Internet Protocol processing).

In addition to the ways of determining functionality for general-purpose processing devices, as described above, the functionality of a device using the ACE architecture can be determined by adaptation information that is used to schedule operations on the computation units. Usage information can include the availability, types and frequency of use of different computation units. Adaptation of the interconnect network, number of active computation units over time, rate of execution of operations, etc., can all be used as usage parameters.

Although the invention has been described with respect to specific embodiments, the embodiments are merely illustrative, and not restrictive, of the invention. For example, although the invention has been discussed where services and functionality are supplied by a "primary company" such a company can be any entity, or collection of entities. For example, the device adaptation can be open to any of several companies or adaptation code developers so that competition can lower costs. The adaptation information can be of the format discussed in related applications with respect to the ACE architecture (see above) or it can be prior art software, firmware, microcode, etc., except where noted otherwise. The adaptation information can include any type of information in any form that can be used to change the functionality or configuration of a device, or to supply new functionality to a device. The way in which the adaptation information achieves new functionality can be by compiled, interpreted, hybrid (a mix), etc., types of code. The adaptation information can be transferred to the device using any type of communication link, protocol and methodology.

Adaptation information can be distributed and obtained by several schemes. For example, instead of a central server providing the adaptation information, the information can be obtained from another server, from a peer-to-peer exchange, from a stored medium such as a magnetic disk, compact disk, digital versatile disk, memory card, etc. Whenever adaptation information, or features, are obtained, an electronic commerce arrangement can be implemented. For example, in a peer-to-peer arrangement, a user can request a feature that is stored at a third party's computer system. The third party can provide a billing arrangement with the user so that the user can pay for the feature, and obtain the feature from the third party. Third party development of features is also anticipated. In other words, developers that are not initially associated with the primary company may design adaptation information to create new, unanticipated, features.

In one embodiment, multiple devices can form a network of functionality and capabilities. Devices use radio frequency (or other) transmissions to communicate over space to establish which devices have what functionality. The devices can then negotiate to transfer functionality according to a payment scheme, license, or other arrangement.

Device networks can also be used to provide processing engines, relays, etc. Groups of devices can be used to perform collective functions where different devices perform different parts of the functions. For example, where there are four devices A, B, C and D; and where device A cannot communicate with device D, device A may be able to relay information or functions to device D via device B or device C. An example of a collective function is where device A directs devices B and C to act as an adaptive antenna with three elements, A, B and C, that could improve the signal to noise ratio of A's transmission or reception.

An array of mobile adaptive devices in the vicinity of a target device can keep a database of environment characteristics of the target device, such as a signal-to-noise ratio of the target device's transmission.

A device between two other devices can perform a translation function. For example, if a WCDMA device tries to communicate with a TDMA device, this can be accomplished by using an intermediary WCDMA-to-TDMA device for the translation. The intermediary device can perform the translation and relay information. Or the intermediary device can provide the adaptation information to one of the other devices to do the translation in one of the other devices.

Software agents can be used to help a user locate a feature. Any manner of searching, distribution or download systems may be used with the present invention.

Thus, the scope of the invention is to be determined solely by the appended claims.

What is claimed is:

1. A method for configuring an adaptable device, the adaptable device comprising a plurality of heterogeneous computational elements coupled to a configurable interconnection network, the method comprising:
   accepting payment for configuring the adaptable device to perform a new functionality;
   using a digital network, transferring adaptation information to the adaptable device;
   configuring the adaptable device to perform the new functionality in response to the adaptation information by configuring the configurable interconnection network to provide corresponding data input and output interconnections between the plurality of heterogeneous computational elements for the new functionality; and
   modifying data stored in the digital network to provide a record of the transfer of the adaptation information, to the adaptable device.

2. The method of claim 1, wherein the digital network comprises the Internet.

3. The method of claim 1, wherein another adaptable device is used to perform at least a part of the transfer of the adaptation information.

4. The method of claim 1, comprising providing the first adaption information on a trial basis.

5. The method of claim 1 comprising using viral network propagation to provide the first adaptation information.

6. The method of claim 1, further comprising permitting the configuration of the adaptable device for the new functionality after the payment is accepted.

7. The method of claim 1, wherein the payment is accepted when a contract for services associated with the adaptable device is made, the services including use of the new functionality.

8. The method of claim 1, wherein the payment is accepted when a request for the new functionality is made.

9. The method of claim 1, wherein the adaptation information is transferred after the payment is accepted.

10. The method of claim 1, wherein the plurality of computational elements are hardware computational elements.

11. The method of claim 1, further comprising licensing the adaptation information in a site license.

12. A method for configuring an adaptable device, the adaptable device comprising a plurality of heterogeneous computational elements coupled to a configurable interconnection network, the method comprising:
defining permitted functionality for the adaptable device;
receiving a request to provide a functionality for the adaptive device;
accepting payment from a user associated with the adaptable device to perform the permitted functionality;
determining whether the permitted functionality of the adaptable device includes the requested functionality and subsequent to accepting payment, unlocking the permitted functionality in the adaptable device; and
when the permitted functionality includes the requested functionality, providing adaptation information to the adaptable device which corresponds to the requested functionality; and configuring the adaptable device to perform the requested functionality by configuring the configurable interconnections between the plurality of heterogeneous computational elements through the interconnection network.

13. The method of claim 12, wherein the step of defining permitted functionality includes storing a list of permissible functions in a digital system.

14. The method of claim 13, wherein the list is stored in a server coupled to the Internet.

15. The method of claim 12, wherein the step of defining permitted functionality further comprises:
defining the permitted functionality in accordance with payments made by the user associated with the given device.

16. The method of claim 12, wherein the method steps are performed by a digital processing system coupled to a network.

17. The method of claim 16, wherein the digital network is the Internet.

18. The method of claim 12, wherein the payment is accepted when a contract for services associated with the adaptable device is made, the services including supply of the permitted functionality.

19. The method of claim 12, wherein the payment is accepted when a request for the permitted functionality is made.

20. The method of claim 12, wherein the adaptation information is transferred after the payment is accepted.

21. The method of claim 12, wherein the plurality of computational elements are hardware computational elements.

22. The method of claim 12, further comprising licensing the adaptation information in a site license.

23. A method of configuring an adaptable device, wherein the adaptable device comprises a configurable interconnection network coupled to plurality of heterogeneous computational elements, the plurality of heterogeneous computational elements, the method comprising:
defining a range of permissible functions for the adaptable device;
providing the adaptable device with adaptation information to configure the adaptable device to perform a function in the range of permissible functions by providing, through the interconnection network and in response to the first adaptation information, corresponding interconnections between the plurality of heterogeneous computational elements, the first adaptation information corresponding to a first geographic location;
accepting a request to enable the adaptable device to perform the function in a second geographic location;

24. The method of claim 23, comprising licensing the first or second adaptation information in a site license.

25. The method of claim 23, comprising unlocking the adaptable device to perform the function after the payment is accepted.

26. The method of claim 23, wherein the payment is accepted when a contract for services associated with the adaptable device is made, the services including use of the function.

27. The method of claim 23, wherein the payment is accepted when a request for the function is made.

28. The method of claim 23, wherein the adaptation information is provided after the payment is accepted.

29. The method of claim 23, wherein the plurality of computational elements are hardware computational elements.

30. A method for configuring an adaptable device, the adaptable device comprising a plurality of heterogeneous computational elements coupled to a configurable interconnection network the method comprising:
defining a range of permissible functions for the adaptable device;
at a first time, providing the adaptable device with first adaptation information to allow the adaptable device to perform a function in the range of permissible functions, by configuring, through the interconnection network and in response to the first adaptation information, corresponding interconnections between the plurality of heterogeneous computational elements;
accepting a request to enable the adaptable device to perform the function at a second time later than the first time, wherein the adaptable device functionality must be modified to achieve the flfst function at the second time;
accepting payment from a user associated with the adaptable device; unlocking the adaptable device to perform the function at the second time later than the first time; and
providing the adaptable device with second adaptation information to allow the adaptable device to perform the first function subsequent to the second time, by configuring, through the interconnection network and in response to the second adaptation information, corresponding interconnections between the plurality of heterogeneous computational elements.

31. The method of claim 30, further comprising unlocking the adaptable device to perform the function after the payment is accepted.

32. The method of claim 30, wherein the payment is accepted when a contract for services associated with the adaptable device is made, the services including supply of the function.

33. The method of claim 30, wherein the payment is accepted when a request for the function is made.

34. The method of claim 30, wherein the adaptation information is provided after the payment is accepted.

35. The method of claim 30, wherein the plurality of computational elements are hardware computational elements.

36. The method of claim 30, comprising licensing the first or second adaptation information in a site license.

37. A method for configuring an adaptable device, the adaptable device comprising a plurality of heterogeneous computational elements coupled to a configurable interconnection network, the method comprising:

licensing adaptation information for configuring the adaptable device to perform new functionality;
transferring adaptation information to the adaptable device using a digital network;
configuring the adaptable device to perform the new functionality in response to the adaptation information by configuring the configurable interconnection network to provide corresponding interconnections between the plurality of heterogenous computational elements for the new functionality; and
modifying data stored in the digital network to provide a record of the transfer of the adaptation information to the adaptable device.

* * * * *